(12) United States Patent
Mahnad et al.

(10) Patent No.: US 8,510,766 B2
(45) Date of Patent: Aug. 13, 2013

(54) DRUM FOR USE IN TESTING OPTICAL TAPE MEDIA AND METHOD AND APPARATUS FOR MOUNTING OPTICAL TAPE MEDIA ON DRUM

(75) Inventors: Faramarz Mahnad, Brookline, MA (US); Scott D. Wilson, Thornton, CO (US); Steve Ray, Longmont, CO (US); Charles R. Watt, Jr., Longmont, CO (US)

(73) Assignee: Oracle International Corporation, Redwood City, CA (US)

( * ) Notice: Subject to any disclaimer, the term of this patent is extended or adjusted under 35 U.S.C. 154(b) by 136 days.

(21) Appl. No.: 13/316,966

(22) Filed: Dec. 12, 2011

(65) Prior Publication Data

US 2013/0152112 A1 Jun. 13, 2013

(51) Int. Cl.
*G11B 7/00* (2006.01)
(52) U.S. Cl.
USPC .......................................... 720/695
(58) Field of Classification Search
USPC .......................................... 720/695
See application file for complete search history.

(56) References Cited

U.S. PATENT DOCUMENTS

| | | | |
|---|---|---|---|
| 5,090,005 A * | 2/1992 | Hara et al. | 369/97 |
| 5,524,105 A | 6/1996 | Brewen et al. | |
| 7,369,483 B2 | 5/2008 | Slafer et al. | |
| 8,045,289 B2 * | 10/2011 | Turner et al. | 360/96.3 |
| 2003/0090605 A1 | 5/2003 | Bruning et al. | |
| 2003/0179504 A1 | 9/2003 | Kondo et al. | |
| 2007/0222096 A1 | 9/2007 | Slafer | |
| 2010/0074090 A1 * | 3/2010 | Lee | 369/103 |
| 2010/0136151 A1 | 6/2010 | Mahnad et al. | |

FOREIGN PATENT DOCUMENTS

WO    9516987    6/1995

OTHER PUBLICATIONS

Velten, Thomas, et al., "Roll-to-Roll Hot Embossing of Microstructures," May 5-7, 2010, Seville, Spain, EDA Publishing/DTIP 2010, ISBN: 978-2-35500-011-9.

* cited by examiner

*Primary Examiner* — Mark Blouin
(74) *Attorney, Agent, or Firm* — Marsh Fischmann & Breyfogle, LLP; Jonathon A. Szumny; Kent A. Lembke (57) ABSTRACT

Various embodiments herein include utilities that facilitate the substantially flat and aligned mounting of optical tape segments on testing drums to increase testing accuracy of the tape segments. In this regard, a drum for testing optical tape media is disclosed having a substantially planar portion onto which first and second ends of an optical tape segment may be mounted to thereby secure the entire tape segment around an outer testing surface of the drum. Also disclosed is fixture that may be used to precisely mount and secure the tape segment over the outer mounting surface of a drum in a manner that reduces axial run-out and wrinkling of the optical tape.

20 Claims, 10 Drawing Sheets

DRUM FOR USE IN TESTING OPTICAL TAPE MEDIA AND METHOD AND APPARATUS FOR MOUNTING OPTICAL TAPE MEDIA ON DRUM

BACKGROUND

1. Field of the Invention

The present invention generally relates to devices and processes for testing optical tape media and, more particularly, to a drum design that facilitates the mounting of optical tape media thereon and an apparatus and method for mounting optical tape media on a drum.

2. Relevant Background

Optical tape is a type of digital storage media that is generally in the form of a long and narrow strip of plastic that is designed to wind around a number of reels and be moved in first and second opposite longitudinal directions by a drive motor (the reels and drive motor being known as a "tape transport system"). As the optical tape is moved about the reels by the drive motor, digital content (e.g., binary data in the form of a series of encoding patterns) may be written and read by one or more lasers which may be embodied in one or more optical pickup units (OPUs).

The encoded binary data may be in the form of "marks" (e.g., indentations, indicia) and "spaces" (e.g., the portion of the tape between adjacent pits) disposed on one or more encoding or recording layers (e.g., each including a dye recording layer, a phase change material such as AgInSbTe, and/or a semi transparent metal reflecting layer). Generally, the smaller the indicia are on the optical media, the higher the capacity is of the optical media.

Testing and evaluation is a vital aspect of the development and production of optical tape media, especially as the size of the pits, lands and other indicia on the optical tape media decreases. Several methods can be used to assess the quality of optical tape media such as measuring its optical signals during a process of reading and/or retrieving data (e.g., sum signal, differential push pull tracking error signal, focus error signal), examining the integrity of its physical and logical formats, performing interchange testing, conducting data verification, and/or the like. For instance, optical signal data may be used to perform a jitter analysis and/or to measure thickness and/or roughness of the media to determine whether the various properties of the optical media are within established tolerances. Each method may be considered a piece of the quality testing puzzle.

In some arrangements, a fully developed tape transport system is used to move an entire length of optical tape media past one or more OPUs which may be used to obtain signals from the entire length of tape and pass such obtained signals to any appropriate arrangement of amplifiers, control units, and the like to test and evaluate various aspects of the optical tape media. In other arrangements, a short segment of a length of optical tape can be mounted on a testing drum which is spun by a motor to repeatedly pass (e.g., rotate) the segment past one or more OPUs for use in obtaining signals and data from the segment. Processing of the signals and data from the short segment can be used to provide an indication of various properties or qualities of the entire length of optical tape from which the segment was obtained.

SUMMARY

It is important when mounting and securing a segment of optical tape media to a testing drum for the tape segment to lay flat against the outer mounting surface of the drum. More specifically, as focusing servos of OPUs are generally operable to handle only a limited degree of tape surface roughness, it is essential that the drum is designed in a manner that allows for a reduced degree of surface roughness of the tape segment to be tested (e.g., where the surface roughness may be transferred to the tape segment from the drum itself). Also in this regard, it is important that wrinkling of the tape segment after the segment is mounted to the drum is reduced as any wrinkles that exist in the tape segment during testing of the tape segment can generate inaccurate testing results. Still further, it is often desired to reduce the degree of axial run-out of the tape segment over the drum outer mounting surface (i.e., the degree to which the tape segment shifts laterally while it is being wound around or otherwise mounted over the outer mounting surface or, in other words, the degree to which a reference plane or line of the tape segment deviates from a reference plane or line of the outer mounting surface as the segment is being wound around the drum).

The inventors have thus determined that apparatuses and processes are needed that facilitate the substantially flat and aligned mounting of optical tape segments on drums to thereby increase testing accuracy of the tape segments. In this regard, a drum is disclosed including an outer mounting or testing surface with a substantially cylindrical portion that receives a portion of an optical tape segment that is to be tested, and a substantially planar region onto which first and second ends of the optical tape segment may be securely mounted to thereby secure the entire tape segment to the drum. For instance, after a first end or portion of a length of optical tape is secured (e.g., via tape or adhesive) to a first part of the planar region, the tape may be pulled and wrapped around the outer testing surface of the drum (so that it lays flat and smooth against the outer testing surface) and then secured at a second portion of the tape to a second part of the planar region. Any leftover portions of the tape may be severed and removed to leave a segment of the tape disposed about the drum. The planar mounting portion enhances the grip and increases the friction between the first portion of tape and the drum (e.g., as compared to a drum having a cylindrical testing surface free of a planar mounting surface) which allows the tape to be pulled and wrapped tightly around the drum to thereby reduce the degree of any wrinkles or other imperfections in the surface of the optical tape.

The diameter or circumference of the drum is selected so that at least one complete pattern (e.g., nanostructure pattern) of the tape segment lays over the cylindrical portion of the mounting surface while portions of the tape segment outside of the at least one complete pattern are attached (e.g., via adhesive such as double-sided sticky tape) to the planar portion of the mounting surface. Once the tape segment is mounted to the drum, the drum may be mounted onto a motor shaft and spun by a motor so that at least one OPU may receive optical signals from the pattern of the tape segment for use in testing of the tape segment (and thus the entire length of optical tape from which the tape segment was obtained). An encoder on the motor can provide an indication of when the planar portion is under the OPU so that a gap signal can be programmed (e.g., by firmware) to disable focusing and tracking by the OPU while the planar portion is under the OPU.

In one aspect, a drum for use in testing optical tape media includes a drum body having a rotational axis and a sidewall disposed about the rotational axis. The sidewall provides a cylindrical testing surface for receiving a segment of a length of optical tape and at least one planar mounting surface extending along a length of the testing surface for receiving first and second ends of the tape segment. Optical signals received from a portion of the tape segment disposed over the outer cylindrical testing surface are processed to test one or more properties of the length of optical tape.

In another aspect, a method of manufacturing a drum for use in testing a segment of tape is disclosed and includes providing a drum having an outer sidewall, removing a portion of the outer sidewall to leave at least one planar surface, and securing at least one substantially planar segment to the planar surface, where at least one tapered transition surface exists between the outer sidewall and the at least one planar segment. In one arrangement, a length of polyester tape (e.g., BoPET) may be disposed about the cylindrical wall and secured at its ends on the at least one planar segment.

In any event, and to precisely mount and secure the tape segment over the testing surface of a drum (e.g., the above discussed drum or a previous drum) in a manner that reduces axial run-out and wrinkling of the optical tape, a tape wrapping apparatus is also disclosed. The tape wrapping apparatus includes a fixture with a number of features that allow a segment of optical tape to be temporarily held squarely above a manually rotatable drum, attached at one end to the drum, precisely wrapped about an outer mounting surface of the drum while an operator adjusts a lateral position of the tape segment to reduce any axial run-out of the segment, and attached at a second end to the drum.

The fixture includes a base, a clamp that is interconnected to the base and is operable to secure a first portion of a length of optical media tape to the base, and a feed roller (e.g., spool) that is interconnected to the base and spaced from the clamp. The feed roller is movable (e.g., slidable) along a first axis and is operable to support a second portion of the optical media tape length that is spaced from the first portion. The fixture also includes a drum that is interconnected to the base and rotatable about a second axis that is parallel to the first axis. The drum is operable to contact a third portion of the optical media tape length that is disposed between the first and second portions of the optical media tape length.

In one arrangement, a crank or other adjustment mechanism interconnected to the drum may be manipulated by an operator to enact rotation of the drum and thus initial winding of the tape segment about the outer mounting surface of the drum. For instance, the feed roller may be slid laterally in first and second opposing directions while the crank is being manipulated to enact lateral positioning of the tape segment over the outer mounting surface of the drum. In one variation, the fixture may be used in conjunction with a microscope or other optical device positioned over the drum that passes images of the optical tape being wrapped around the drum to a display for viewing by an operator.

In another aspect, a method for mounting a segment of optical tape over a cylindrical testing surface of a testing drum is disclosed. The method includes fixing a first portion of a length of optical tape to a fixture; positioning a second portion of the optical tape length over a feed roller of the fixture; first securing a third portion of the optical tape length to a mounting surface of a sidewall of a testing drum of the fixture, where the third portion is disposed between the first and second portions; first severing the optical tape length adjacent the third portion; rotating the testing drum about a first axis to wrap the optical tape length around a cylindrical testing surface of the sidewall of the testing drum; second securing a fourth portion of the optical tape length to the mounting surface of the testing drum; and second severing the optical tape length adjacent the fourth portion. After the optical tape length has been severed adjacent the fourth portion, a segment of the optical tape length is secured to the testing drum.

The method may include moving (e.g., sliding) the feed roller along at least one of first and second opposing directions. In one arrangement, an operator may monitor for axial run-out of the optical tape length over the cylindrical testing surface of the testing drum (e.g., the shifting of placement of the optical tape over the outer mounting or testing surface of the testing drum along the testing drum rotational axis as the drum is being rotated), and the moving may occur responsive to axial run-out detected during the monitoring. For instance, the operator may slide the feed roller to reduce the axial run-out (e.g., towards a "zero" position) upon detecting axial run-out while monitoring.

Any of the embodiments, arrangements, or the like discussed herein may be used (either alone or in combination with other embodiments, arrangement, or the like) with any of the disclosed aspects. Merely introducing a feature in accordance with commonly accepted antecedent basis practice does not limit the corresponding feature to the singular Any failure to use phrases such as "at least one" does not limit the corresponding feature to the singular. Furthermore, a reference of a feature in conjunction with the phrase "in one embodiment" does not limit the use of the feature to a single embodiment.

In addition to the exemplary aspects and embodiments described above, further aspects and embodiments will become apparent by reference to the drawings and by study of the following descriptions.

DETAILED DESCRIPTION

Various embodiments herein include utilities that facilitate the substantially flat and aligned mounting of optical tape segments on testing drums to increase testing results accuracy of the tape segments. In this regard, a drum is disclosed having a substantially planar portion onto which first and second ends of an optical tape segment may be mounted to thereby secure the entire tape segment around an outer testing surface of the drum in a substantially flat manner. A smooth layer or film (e.g., polyester film such as BoPET film) may be wrapped around the outer mounting surface and secured to the planar portion before the optical tape segment is so secured to provide a smooth surface for support of the segment. To precisely mount and secure the tape segment over the outer mounting surface of a drum in a manner that reduces axial run-out and wrinkling of the tape segment, a fixture is also disclosed herein that includes a plurality of features that allow the segment to be temporarily held squarely above the drum and attached at a first portion to the drum, precisely wrapped about the outer mounting surface of the drum, and attached at a second portion to the drum. For instance, an operator can monitor for axial-run out of the tape segment as it is being wrapped (e.g., shifting of position over the outer mounting surface of the drum along the drum's rotational axis) and slide a feed roller supporting the length of optical tape from which the segment is being obtained to correct any such axial run-out. Advantageously, an optical tape segment can be more precisely mounted and aligned on the drum which thereby increases the accuracy of subsequent testing of the tape segment.

Figure 1:
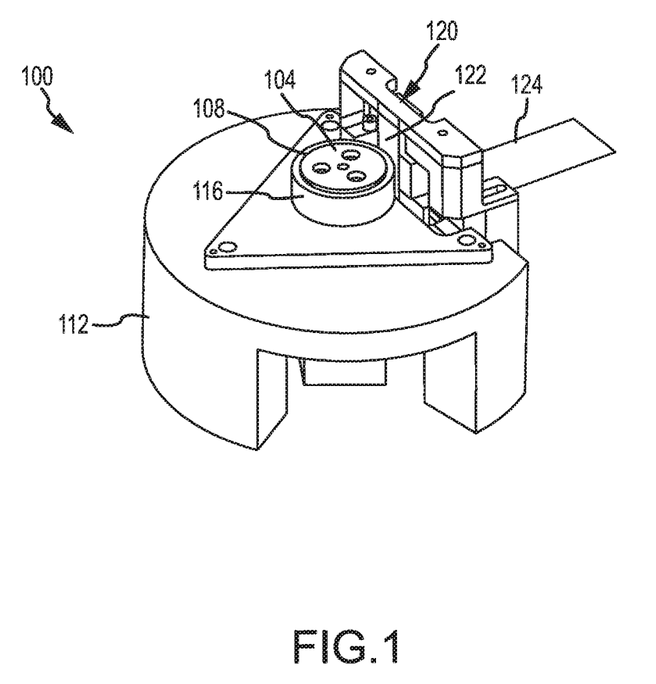
FIG. 1 is a perspective view of an apparatus for testing one or more properties of a segment of optical tape.

Turning now to FIG. 1, a perspective view of an apparatus 100 (e.g., a "drum tester") for testing one or more properties of a length of optical tape is illustrated. Generally, a short segment of a length of optical tape can be mounted on the apparatus 100 and spun by a motor so that it is repeatedly passed by at least one OPU which may obtain signals and/or other data from the segment. The signals and data may then be processed to acquire various properties or qualities of the entire length of optical tape (e.g., for determining whether such properties or qualities are within established tolerances).

The apparatus 100 may generally include a rotating shaft 104 about which a cylindrical testing drum or drum 108 may be securely mounted (e.g., so as to rotate as one-piece with the shaft 104). The shaft 104 may be appropriately coupled to a motor (not shown) which may be housed and secured within a base 112. The motor may be coupled to any appropriate power supply (e.g., DC, AC) and controller for rotating the shaft 104 at any desired (e.g., constant) speed. A length or segment of optical tape 116 (e.g., including a pattern of any appropriate pre-formatted structures such as nanometer scale grooves) may be secured about a outer surface of the drum 108 and may be repeatedly rotated or passed by at least one OPU 120 (e.g., commercial OPU) which serves to obtain optical signals from the tape segment surface which may be subsequently processed (e.g., by a processing engine or controller of an associated computing system, not shown) to obtain one or more properties of the tape segment 116 (e.g., for use in measuring a quality of the tape segment 116 and thus the length of tape from which the segment was obtained). The OPU 120 may be positioned at a close distance to the tape segment 116 within a focus range of the OPU 120. An optical compensating lens 122 may be included to facilitate optical coupling of the OPU 120 to the optical tape 116 (e.g., to account for the lack of a cover layer on the optical tape). The apparatus 100 may also include an adjustment fixture 124 interconnected to the OPU 120 to effect alignment of the OPU 120 relative to a surface of the tape segment 116.

Figure 2:
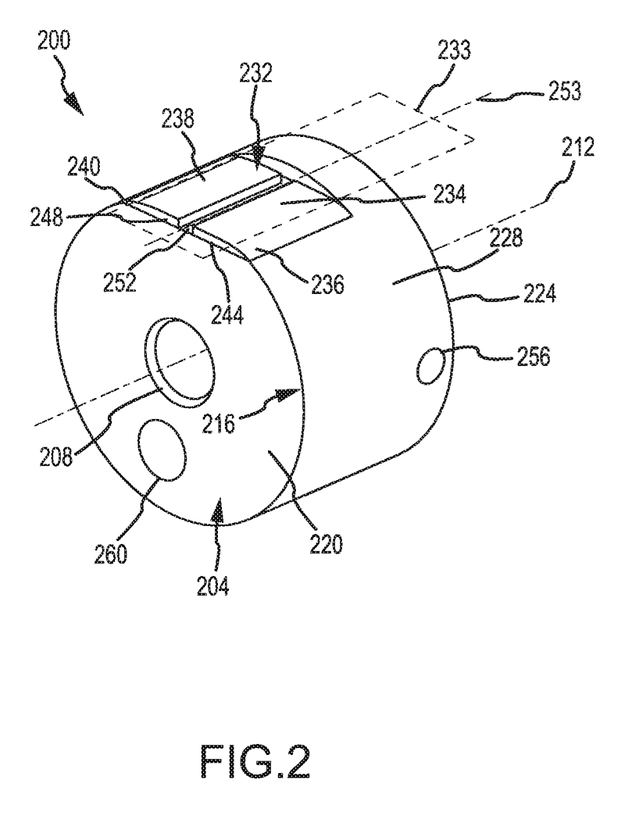
FIG. 2 is a perspective view of a testing drum for use with testing a segment of optical tape, such as the apparatus of FIG. 1.
Figure 3:
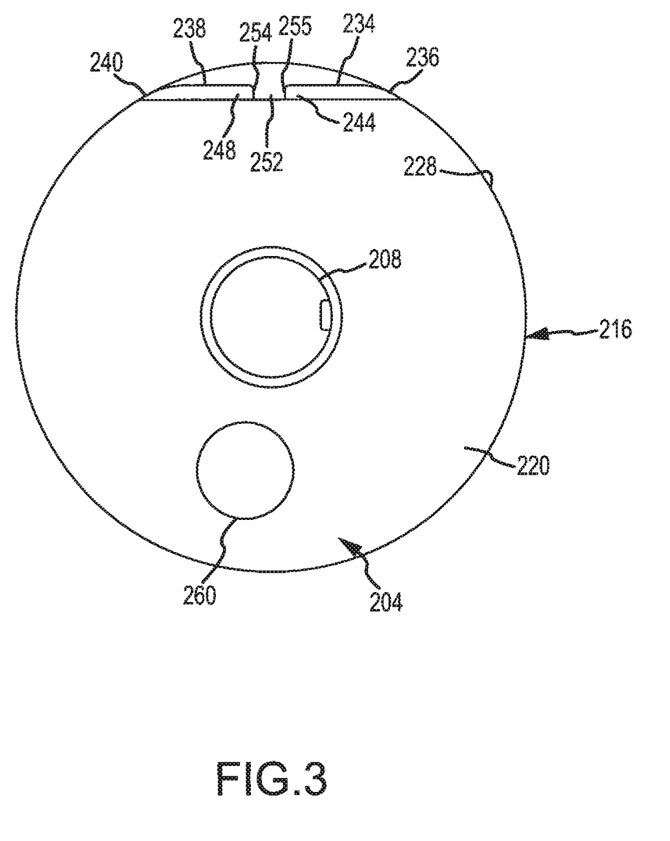
FIG. 3 is a side view of the drum of FIG. 2.

As discussed previously, it is important when mounting and securing a segment of optical tape media to a drum for the tape segment to lay flat against the outer mounting surface of the drum (e.g., as focusing servos of OPUs can generally only handle a limited degree of tape surface roughness). Turning now to FIGS. 2-3, a drum 200 for use with testing a segment of optical tape is illustrated. For instance, the drum 200 may be used in place of the drum 108 in the testing apparatus 100 of FIG. 1 (e.g., where the shaft 104 would be sized to be inserted into a central aperture 208 of the drum 200) and/or other appropriate testing apparatus that includes a rotating shaft about which the drum 200 may be securely mounted.

The drum 200 may generally include a cylindrically-shaped drum body 204 having first and second end surfaces or walls 220, 224, a circumferential portion or sidewall 216 that provides a receiving surface for optical tape, and a central aperture 208 into which a rotatable shaft of a motor may be inserted (e.g., such as shaft 104 of testing apparatus 100 of FIG. 1, sized to securely fit within central aperture 208) for rotation of the drum 200 in at least one of first and second opposing rotational directions about a rotational axis 212 (e.g., where a longitudinal axis of the central aperture 208 is substantially collinear with the rotational axis 212). It is noted that unless otherwise specified, it is to be understood that components disclosed herein as having a particular feature may encompass the corresponding characteristic and insubstantial variations thereof (e.g., the "cylindrically"-shaped drum body 204 need not be perfectly cylindrical, a particular reference plane being "perpendicular" to one or more axes need not be perfectly perpendicular to the axes, and the like).

As shown, the sidewall 216 includes or provides an outer cylindrical tape receiving or testing surface 228 and a planar mounting surface or region 232 extending along the testing surface 228 and generally residing in a reference plane 233 that is parallel to the rotational axis 212. The planar mounting region 232 provides a level surface upon which an end or portion of a length of optical tape may be secured which allows the tape to be pulled and/or wrapped tightly over and around the testing surface 228 and then secured at another portion of the planar mounting region 232. For instance, the testing surface 228 may extend around at least 300° of the sidewall 216, which has been found to provide the planar mounting region with sufficient surface area over which to secure the optical tape, optional underlayer of smoothness enhancing material (discussed below), and the like. In other embodiments, the testing surface 228 may extend around greater portions of the sidewall 216 so long as the planar mounting surface functions to provide a suitable mounting surface for the above discussed materials.

In one arrangement, the sidewall 216 may include at least one tapered transition surface between the testing surface 228 and the planar region 232, such as first and second tapered transition regions 236, 240. The first and second transition regions 236, 240 gradually reduce the curvature of the sidewall 216 from that of the testing surface 228 (which is related to the diameter of the drum body 204) to that of the planar region (which is zero) which serves to provide smooth and stable supporting surface for the optical tape and/or smoothness enhancing strip between the testing surface 228 and the planar region 232 and limit the ability of bubbling of the tape or strip in the transition regions (e.g., due to air or other fluids or materials becoming trapped between the tape/strip and the sidewall 216).

In another arrangement, the planar region 232 may include first and second planar mounting surfaces 234, 238 separated by a gap 252 (e.g., where the gap 252 is defined by end walls 254, 255 and generally resides along a reference axis 253 parallel to rotational axis 212) that are operable to receive respective first and second ends or portions of a segment or portion of optical tape. The gap 252 facilitates the severing or cutting of excess portions of optical tape from a segment of optical tape already secured to the drum 200 (discussed in more detail below). For instance, the gap 252 may have a width (e.g., the distance between end walls 254, 255) of between about 0.5 cm to 3 cm, such as between about 1-2 cm. In one embodiment, the drum 200 may be a substantially one-piece body, where the drum body 204 is machined or otherwise formed to include the first and second planar mounting surfaces 234, 238, gap 252, and the like. In another embodiment, the drum body 204 may be machined or otherwise formed to include a single level platform (not labeled)

over which first and second mounting members 244, 248 may be appropriately fixed or secured, where the first and second mounting members 244, 248 respectively include the first and second planar mounting surfaces 234, 238. In one variation, the first and second mounting members 244, 248 may additionally include the first and second transition surfaces 236, 240. In another variation, the drum body 204 may be machined or formed to include both a single level platform in addition to the first and second transition surfaces 236, 240 while the first and second mounting members 244, 248 would include the first and second planar mounting surfaces 234, 238.

Figure 4:
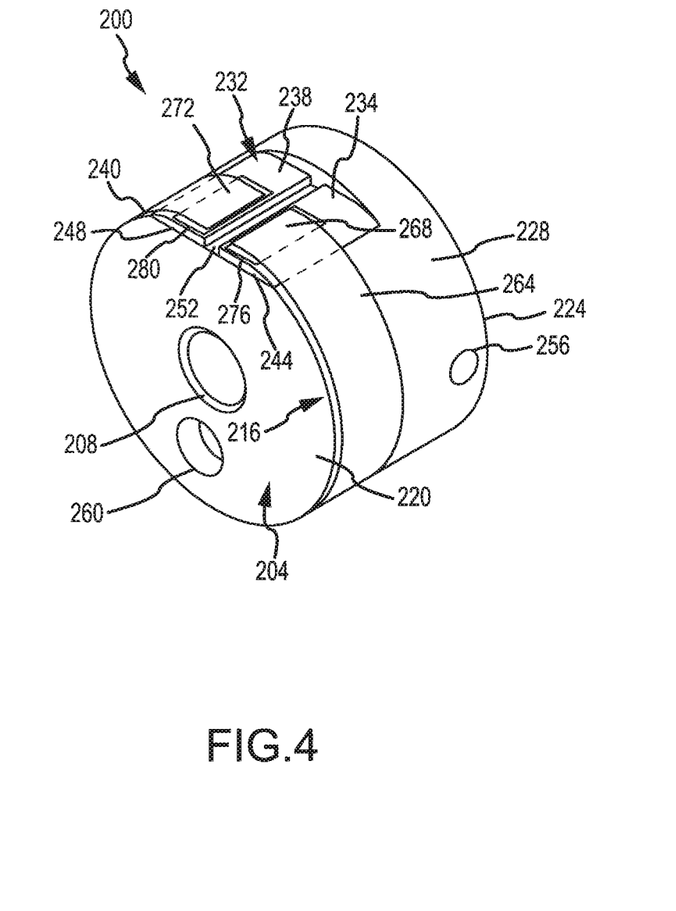
FIG. 4 is a perspective view of the drum of FIG. 1, but with a layer of polyester film wrapped around the drum for increasing the smoothness of the mounting surface of the drum.

In any event and as discussed above, OPU focusing servos may be limited in the degree of surface roughness of a portion of optical tape that they can properly handle (much of which is transferred from the testing surface 228 of the drum 200 through to the active surface of the optical tape). Furthermore, it is often difficult to machine the testing surface 228 down to a level of surface roughness that can be properly handled by the focusing servos. In this regard, and turning now to FIG. 4, one embodiment of the present disclosure includes wrapping or otherwise mounting a layer or film of any appropriate smoothness enhancing material over the testing surface 228 as an underlayer to a portion of optical tape wrapped around the testing surface 228. In one arrangement, a strip 264 of polyester film (e.g., BoPET) may be wrapped around the testing surface 228 and secured in any appropriate fashion at the planar mounting region 232. For instance, a first end or portion 268 of the strip 264 may be secured to the first planar mounting surface 234 with a first piece 276 of adhesive (e.g., double-sided sticky tape) and a second end or portion 272 of the strip 264 may be secured to the second planar mounting surface 238 with a second piece 280 of adhesive (e.g., double-sided sticky tape). The strip 264 may generally be mounted over the entire area over which a portion of optical tape is to be mounted. In one arrangement, the strip 264 may have a surface roughness of less than about 50 nanometers.

Figure 5:
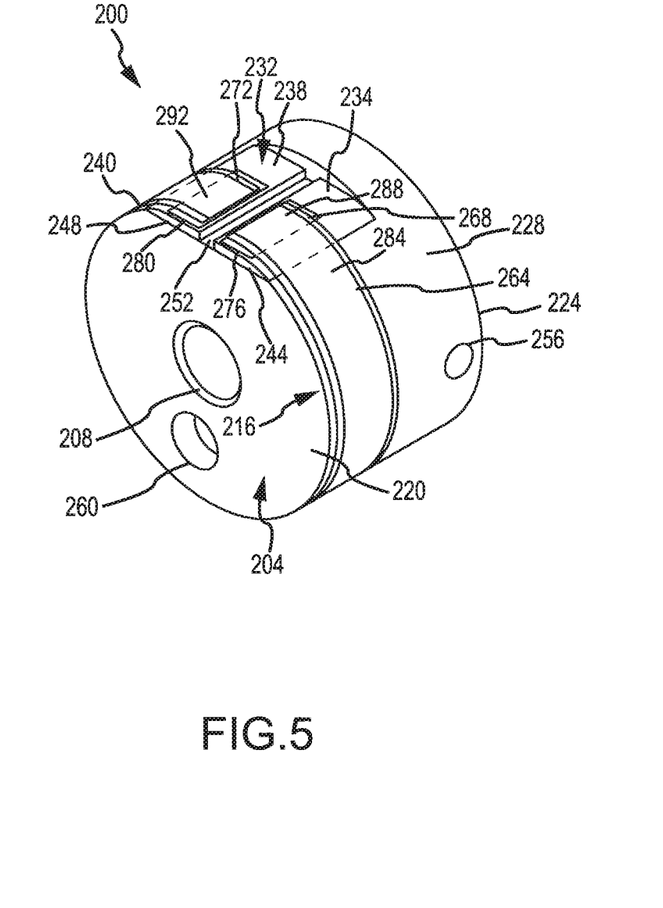
FIG. 5 is a perspective view similar to FIG. 4, but with an optical tape segment disposed over the polyester film.

FIG. 5 illustrates the drum 200 after a segment 284 of optical tape has been wrapped around the testing surface 228 over the strip 264 of polyester film (e.g., with the active, nanometer scale patterned surface facing outwardly) and secured via first and second ends or portions 288, 292 over the first and second planar mounting surfaces 234, 238. For instance, the optical tape segment 284 may be mounted so that at least one full pattern of nanometer-scale grooves and/or structures (facing outwardly) is laid over the testing surface 228 and that portions outside of the at least one full pattern are laid over the planar region 232 (and possibly even the first and second transition surfaces 236, 240).

Figure 10:
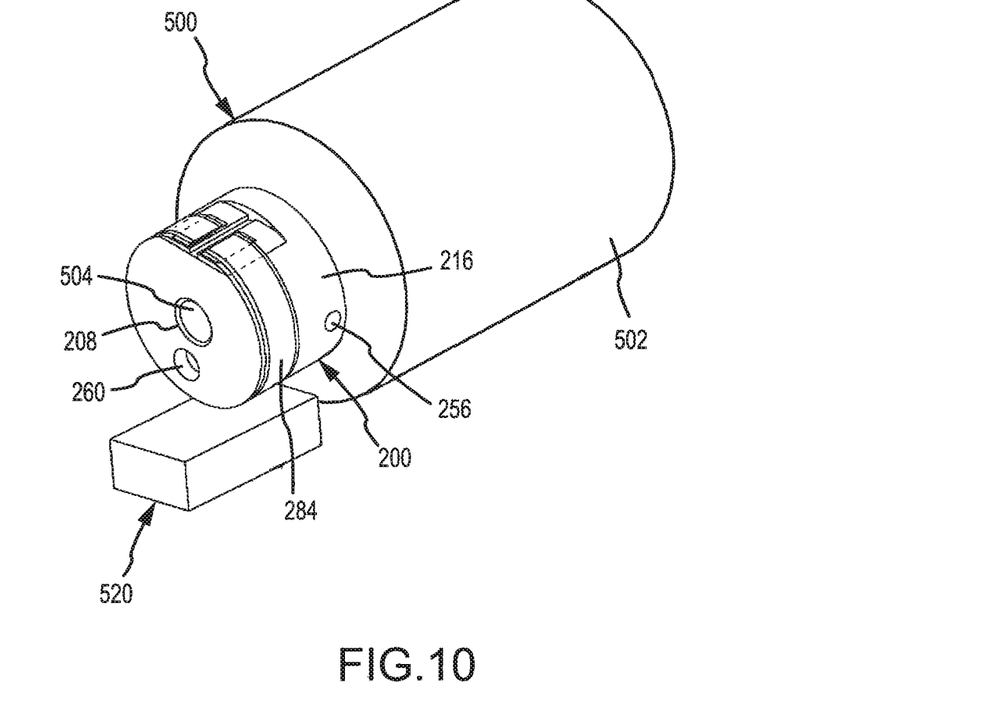
FIG. 10 is a perspective view of an apparatus for testing one or more properties of a segment of optical tape.

With additional reference now to FIG. 10, a drum testing apparatus 500 is illustrated that has the drum 200 and optical tape segment 284 of FIG. 5 installed thereon. As shown, the apparatus 500 generally includes a motor 502 that powers a rotatable shaft 504 over which the central aperture 208 of the drum 200 is secured (e.g., via threading a set screw or other fastener through at least one bore 256 extending from the sidewall 216 to the central aperture 208 against the rotatable shaft 504). The testing apparatus 500 also includes an OPU 120 that is appropriately spaced from the optical tape segment 284 so as to obtain signals therefrom in conjunction with rotation of the rotatable shaft 504 and thus the drum 200 and active surface of the optical tape segment 284.

The drum 200 may include one or more features to facilitate accurate and secure mounting of the drum 200 to the rotatable shaft 504 of the testing apparatus 500. In one arrangement, the drum 200 may include at least one balancing hole 260 disposed through at least a portion of one of end walls 220, 224 (not labeled in FIG. 10) for use in facilitating non-eccentric rotation of the drum 200 by the rotatable shaft 504. For instance, upon mounting the drum 200 onto the rotatable shaft 504 and energizing the motor 502 to cause the rotatable shaft 504 and drum 200 to rotate, an operator or user may monitor the drum 200 for eccentric rotation. Upon determining that eccentric rotation exists, the operator may form the least one balancing hole 260 in a location from which drum body material needs to be removed to restore non-eccentric rotation of the drum 200.

To account for possibly inactive portions of the optical tape segment 284 disposed over the planar mounting region 232, an encoder on the motor can provide an indication of when the planar mounting region 232 is about to pass under the OPU 520 (i.e., when the OPU 520 would otherwise attempt to obtain optical signals from surfaces over the planar mounting region 232) so that a gap signal can be programmed (e.g., by firmware of an associated computing system) to temporarily disable focusing and tracking by the OPU 520. Thereafter, focusing and tracking by the OPU 520 can be restored upon the testing surface 228 being again disposed under the OPU 520. In one arrangement, the first and second transition surfaces 236, 240 may trigger the deactivation and activation of focusing and tracking by the OPU 520.

Turning back to FIG. 5, third and fourth pieces of adhesive (e.g., double-sided sticky tape, not shown) may be disposed between the first and second portions 268, 272 of the polyester strip 264 and the first and second portions 288, 292 of the optical tape segment 284 to secure the first and second portions 288, 292 of the optical tape segment 284 to or over the first and second planar mounting surfaces 234, 238. In another arrangement, the first and second pieces 276, 280 of adhesive may be used to secure both the first and second portions 268, 272 of the polyester strip 264 and the first and second portions 288, 292 of the optical tape segment 284 to the first and second planar mounting surfaces 234, 238. For instance, holes may be formed through the first and second portions 268, 272 of the polyester strip 264 before the first and second portions 268, 272 are secured to the first and second planar mounting portions 234, 238. Upon subsequent attachment of the first and second portions 268, 272 to the first and second pieces 276, 280 of adhesive, the holes may provide access to the first and second pieces 276, 280 of adhesive for contact by the first and second portions 288, 292 of the optical tape segment 284. Other arrangements are also envisioned and encompassed within the present disclosure.

It is to be understood that the drum 200 is not limited to use with the specific testing apparatus 500 illustrated in FIG. 10 and described herein. Rather, the drum 200 may be utilized in conjunction with any arrangement whereby a drum can be mounted on a rotating shaft and passed by one or more OPUs for use in measuring one or more properties or qualities of a segment of optical tape mounted on the testing surface 228 of the drum. For instance, the drum 200 may be installed onto the rotatable shaft 104 of the apparatus 100 of FIG. 1 (e.g., where the rotatable shaft 104 is sized to be inserted into the central aperture 208 of the drum 200 or the central aperture 208 is sized to be installed over the rotatable shaft 104).

Figure 6:
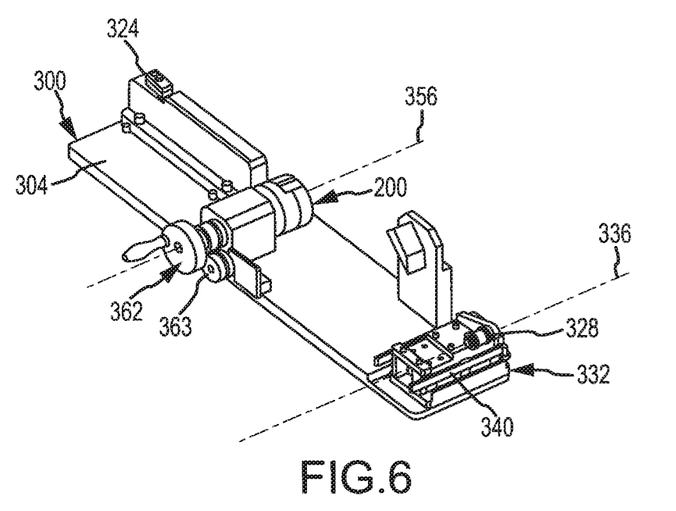
FIG. 6 is a perspective view of a fixture that may be used to wrap a segment of optical tape around a drum.
Figure 7:
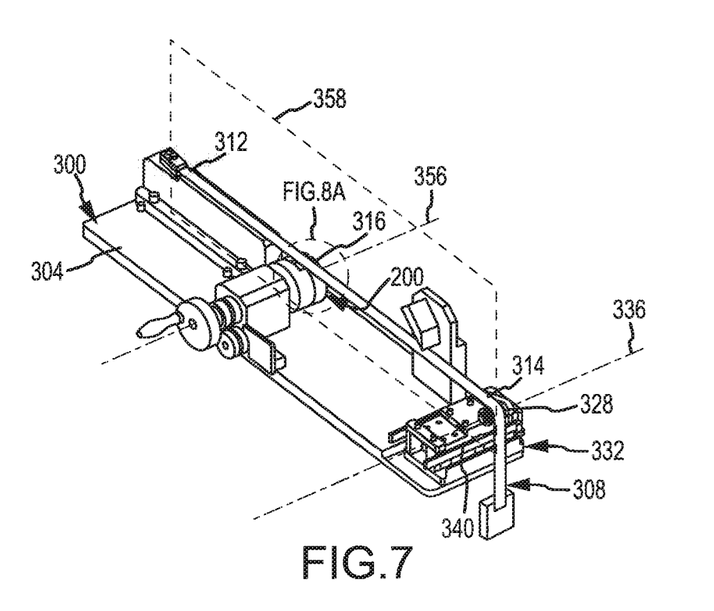
FIG. 7 is a perspective view of the fixture of FIG. 6, but with a length of optical tape secured to the fixture.

Turning now to FIGS. 6-7, perspective views of a tape wrapping apparatus or fixture 300 are illustrated that allows an optical tape segment to be precisely mounted over an outer testing surface of a drum (e.g., the above discussed drum or a previous drum) in a manner that reduces axial run-out and wrinkling of the optical tape. To facilitate the reader's understanding of the various functionalities of the fixture 300, the fixture 300 will be discussed in conjunction with the flow diagram of FIG. 9 which illustrates a method 400 of wrapping an optical tape segment around a drum.

Figure 9:
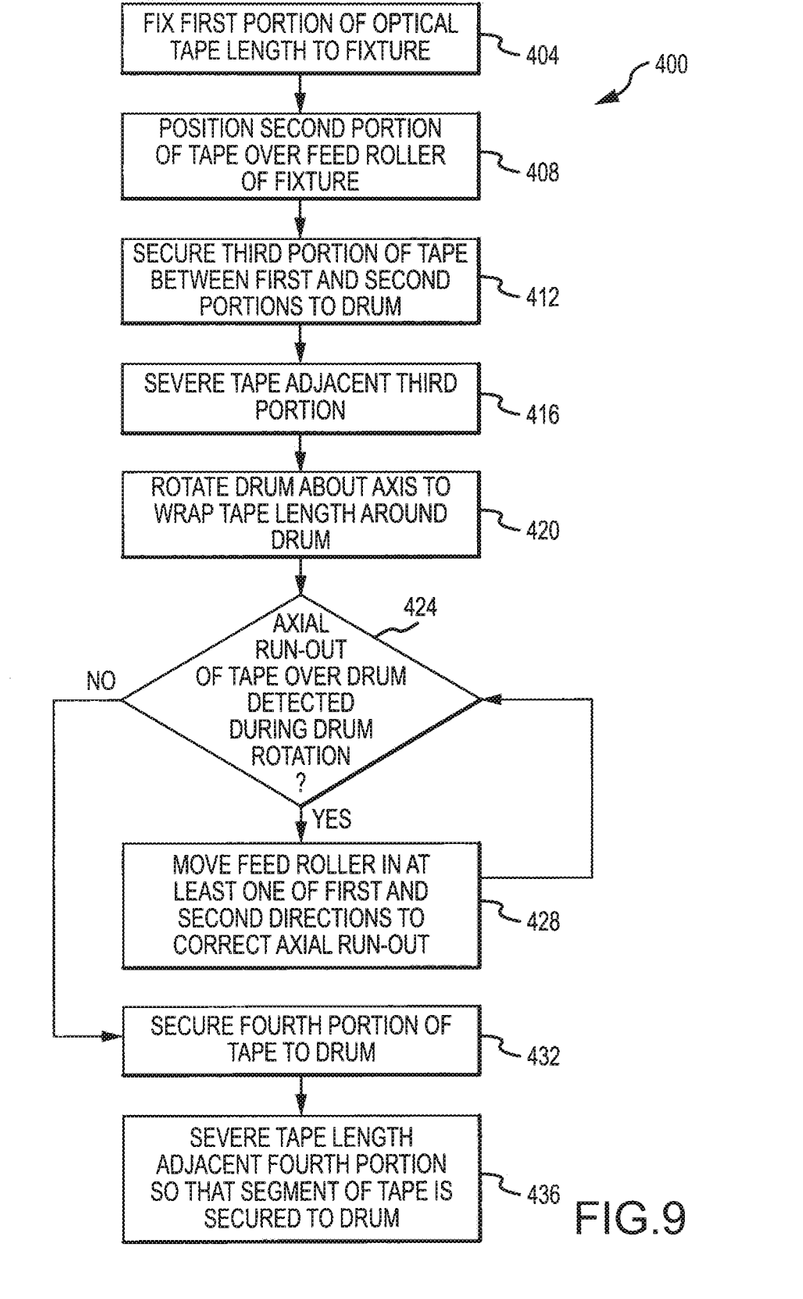
FIG. 9 is a flow diagram of a method for wrapping an optical tape segment around a drum.

At 404, a first portion 312 of a length of optical tape 308 may be fixed or secured to the fixture 300. As seen in FIGS. 6-7, the fixture 300 may generally include a base 304 along with a number of features or components that facilitate the precise wrapping of a segment of the length of optical tape 308 about drum 200 (or another cylindrical drum). One of the features may be a securing or clamping arrangement 324 into which the first portion 312 of the optical tape 308 may be inserted as part of step 404 of the method 400. The method 400 may also include positioning 408 a second portion 314 of the optical tape 308 over a feed spindle or roller 328 of the fixture 300. The feed roller 328 may be fixed to a sled or sliding mechanism 332 that allows the feed roller 328 to be moved or slid in first and second opposing directions along an axis 336 for reasons that will be discussed more fully below. In one arrangement, the sliding mechanism 332 may include a brake 340 to allow for fine adjustment of the feed roller 328 along the axis 336 and/or lock the sliding mechanism 332 to limit sliding along the axis 336.

Figure 8A:
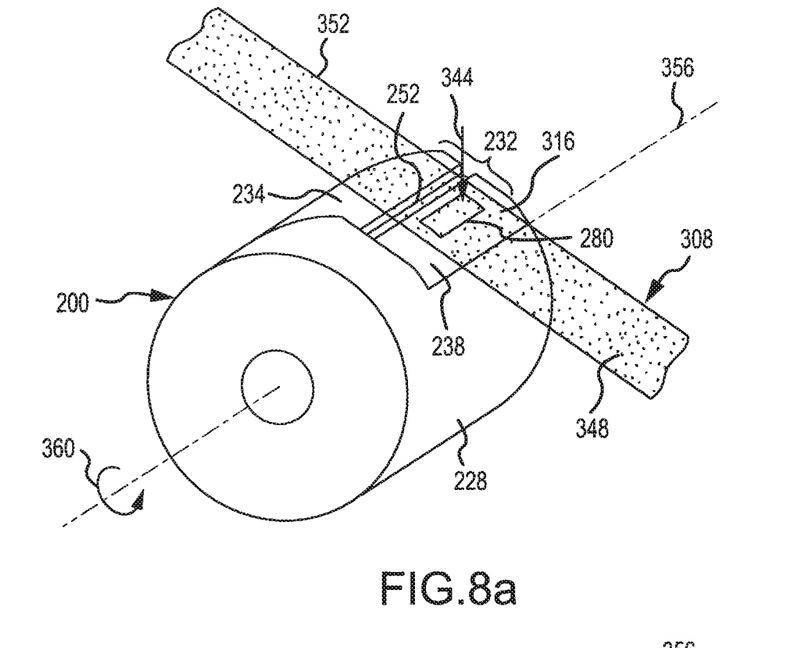
FIGS. 8a-8d are perspective views of various rotational orientations of a drum used with the fixture of FIGS. 6-7.

The method 400 may also include securing 412 a third portion 316 of the optical tape 308 to the drum 200. Turning now to FIG. 8a, a close-up perspective view of the optical tape 308 disposed over the drum 200 is shown. For clarity, any smoothness enhancing material (e.g., polyester strip 264) that might otherwise be secured to the drum 200 as an underlayer to the optical tape 308 has been removed. For instance, an operator may press the third portion 316 towards adhesive piece 280 in the direction 344 to secure 412 the same to the second planar mounting surface 238 of the drum 200. It should be appreciated that the "first" and "second" planar mounting surfaces are merely arbitrary labels and that an operator could just as well secure the third portion 316 to the first planar mounting surface 234 depending upon an orientation of the clamping arrangement 324, feed roller 328, and the like.

Figure 8B:
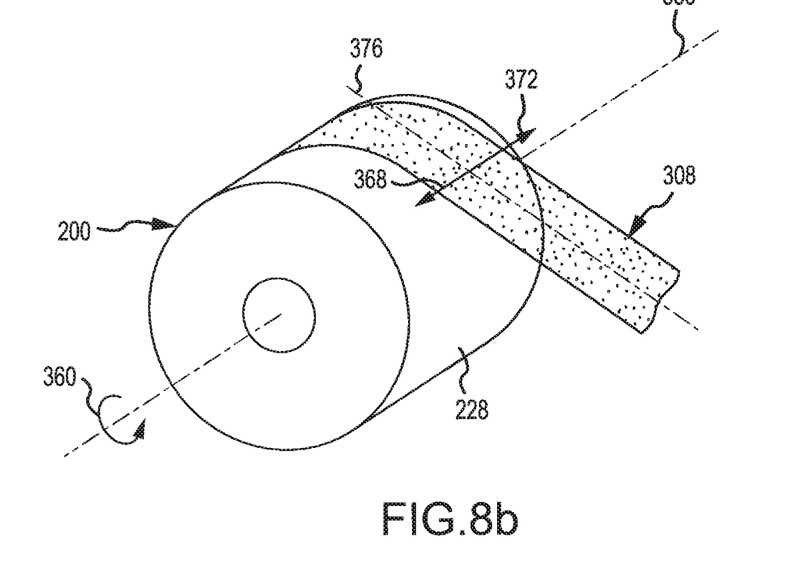

The method 400 may then include severing 416 the optical tape 308 adjacent the third portion 316. For instance, an operator may utilize any appropriate instrument (e.g., blade, scissors, and the like) to sever or cut the optical tape 308 over the gap 252 of the drum; doing so separates the optical tape into first and second pieces 348, 352. At this point, the second piece 352 can be discarded or otherwise removed from the drum 200. The method 400 may then include rotating 420 (e.g., in a counterclockwise direction 360) the drum 200 about an axis 356 so as to wrap the first piece 348 of the optical tape 308 in a flat and precise manner about the testing surface 228 of the drum 200. See FIG. 8b which illustrates the drum 200 after it has been rotated through part of a revolution (the planar mounting region 232 is not visible in this figure). For instance, an operator may utilize a crank 362 that is appropriately interconnected to the drum 200 to rotate the same. The crank 362 may include any appropriate friction mechanism 363 that serves to increase the degree to which an operator must apply force to the crank 362 to cause a corresponding rotation of the drum 200.

To facilitate the substantially tight and flat wrapping of the optical tape 308 about the testing surface 228 of the drum 200, a weight 364 may be secured to the optical tape 308 (see FIG. 7) that serves to pull the second piece 348 of optical tape 308 in a direction opposed to that in which the drum 200 is tending to pull the second piece 348; in this regard, at least some wrinkles and/or other imperfections in the optical tape 308 may be stretched out and/or limited. Furthermore, the mass of the weight 364 can be appropriately selected to stretch out wrinkles and/or other imperfections as discussed above in a manner free of tearing or otherwise damaging the optical tape 308.

In any event, the method 400 may query 424 whether axial run-out of the optical tape 308 over the testing surface 228 of the drum 200 has been detected and, if so detected, proceed to move 428 the feed roller 328 in at least one of first and second opposing directions (e.g., along axis 336 via sled mechanism 332, see FIG. 6) to correct the axial run-out. For instance, and with reference to FIG. 8b, an operator could monitor (e.g., via a microscope or other optical device positioned over the drum that passes images of the optical tape being wrapped around the drum to a display for viewing by the operator) whether the optical tape 308 has shifted in its positioning over the testing surface 228 of the drum 200 in at least one of first and second directions 368, 372 parallel to axis 356 away from a starting reference line or axis 376. More specifically, it may be advantageous for the optical tape 308 to maintain a constant position with respect to a particular reference line or axis (e.g., axis 376) as it is being wrapped around the drum 200 (e.g., in relation to the optical signals obtained by an OPU (e.g., OPU 120 in FIG. 1) and subsequent testing accuracy). In this regard, upon determining that axial run-out of the optical tape 308 has occurred in at least one of first and second directions 368, 372, the operator could utilize sled mechanism 332 to slide feed roller 328 along axis 336 in a direction opposite to that in which the optical tape 308 has moved so that incoming portions of the optical tape 308 (i.e., portions of the second piece 348 that are about to make contact with the testing surface 228) are moved back towards the reference axis 376.

As shown, the clamping arrangement 324, drum 200 and feed roller 328 are adapted to be disposed within or intersect a reference plane 358 (see FIG. 7). For instance, the clamping arrangement 324, drum 200 and feed roller 328 may generally be aligned with the reference plane 358 at least upon inital contact of the third portion 316 with the drum 200 (which may correspond to a "zero" degree of axial run-out of the optical tape 308). Furthermore, the axes 336, 356 may be substantially parallel to each other and perpendicular to the reference plane 358.

Figure 8C:
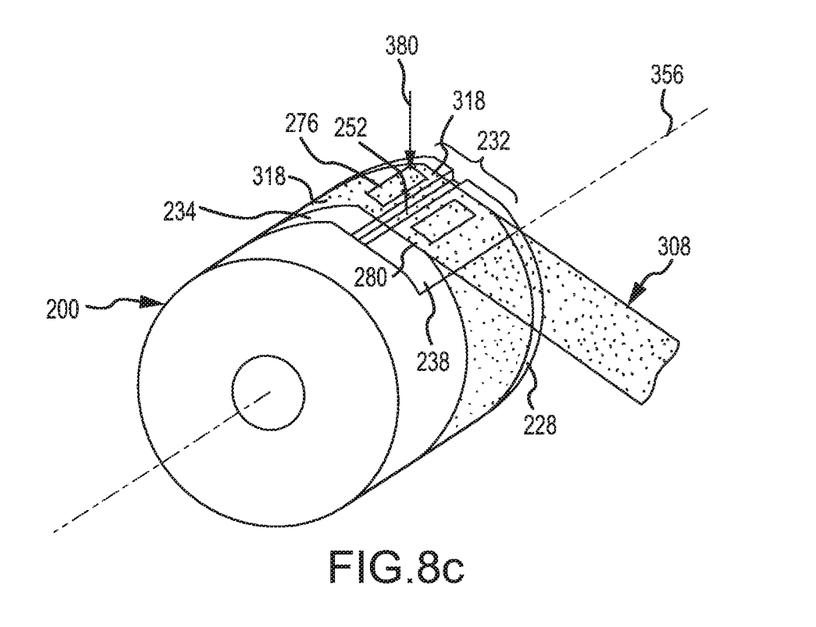

The operator may continually monitor for axial run-out from the time the third portion 316 contacts the second planar mounting surface 238 until the time that a fourth portion 318 of the optical tape 308 is disposed over the planar mounting region 232 of the drum 200 (e.g., which may occur once the drum 200 has rotated through almost a full revolution so that at least one full pattern of nanometer-scale grooves or structures has been wrapped around the testing surface 228 of the drum 200). See FIG. 8c. As seen in FIG. 9, the method 400 may include securing 432 the fourth portion 318 to the planar mounting region 232, such as by pressing the fourth portion 318 in the direction 380 against adhesive piece 276 on the first planar mounting surface 234. In one arrangement, the fourth portion 318 may be "automatically" secured to the first planar mounting surface 234 via the adhesive piece 276 due to the angle of the feed roller 328 relative to the drum 200.

Figure 8D:
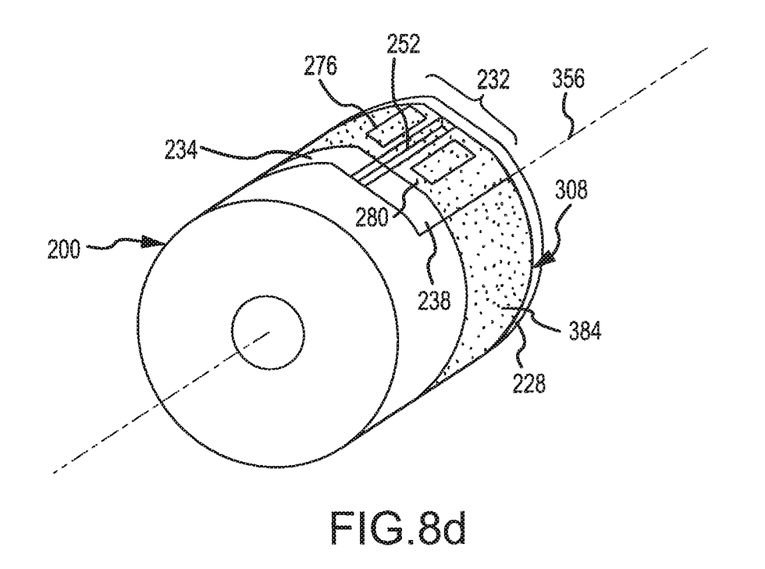

The method 400 may then include severing 436 the optical tape 308 adjacent the fourth portion 318. Compare FIGS. 8c and 8d. For instance, a blade or other instrument may be used to cut or sever the optical tape 308 over the gap 252 of the drum 200, and the excess portion of the optical tape 308 may be discarded. At this point, a segment 384 of the optical tape 308 is secured to the drum 200 in a manner that is precisely aligned and that exhibits an increased level of smoothness to thereby enhance subsequent testing results of the optical tape segment 384. The drum 200 may now be appropriately secured or installed onto a rotatable shaft of a testing apparatus (e.g., testing apparatus 100 of FIG. 1, testing apparatus 500 of FIG. 10, other testing apparatuses, and the like) for use in testing one or more properties or qualities of the optical tape segment 384 and thus the entire length of the optical tape 308 from which the tape segment 384 was obtained. While not specifically shown, the polyester strip 304 (or other smoothness enhancing material) may also be wrapped around and secured to a drum using the fixture 300.

While this specification contains many specifics, these should not be construed as limitations on the scope of the disclosure or of what may be claimed, but rather as descriptions of features specific to particular embodiments of the disclosure. Furthermore, certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. The above described embodiments including the preferred embodiment and the best mode of the invention known to the inventor at the time of filing are given by illustrative examples only.

We claim:

1. A drum for use in testing optical tape media, the drum comprising:
a drum body having a rotational axis and a sidewall disposed about the rotational axis, the sidewall providing a cylindrical testing surface for receiving a segment of a length of optical tape and at least one planar mounting surface extending along a length of the testing surface for receiving first and second ends of the tape segment, wherein optical signals received at an optical pickup unit from a portion of the tape segment disposed over the outer cylindrical testing surface are processed to test one or more properties of the length of optical tape.

2. The drum of claim 1, wherein the at least one planar mounting surface substantially resides in a reference plane that is parallel to the rotational axis.

3. The drum of claim 1, wherein the at least one planar mounting surface comprises first and second planar mounting surfaces that are separated by a gap.

4. The drum of claim 3, wherein the gap resides along a line that is substantially parallel to the rotational axis.

5. The drum of claim 3, further comprising:
first and second mounting members secured to the sidewall of the drum body, wherein the first and second mounting members respectively comprise the first and second planar mounting surfaces.

6. The drum of claim 3, further comprising:
a first tapered transition surface disposed between the first planar mounting surface and the cylindrical testing surface; and
a second tapered transition surface disposed between the second planar mounting surface and the cylindrical testing surface.

7. The drum of claim 1, further comprising:
a layer of film disposed over the outer cylindrical testing surface and having a surface roughness of less than about 0.01 nanometers.

8. The drum of claim 7, wherein the layer of film comprises biaxially-oriented polyethylene terephthalate (BoPET).

9. The drum of claim 1, further comprising:
a first aperture disposed through the drum body having a longitudinal axis that is substantially collinear with the rotational axis; and
a second aperture disposed through the drum body having a longitudinal axis that is spaced from and substantially parallel to the first aperture longitudinal axis.

10. The drum of claim 1, wherein the cylindrical testing surface extends around at least 300° of the sidewall of the drum body.

11. A fixture, comprising:
a base;
a clamp that is interconnected to the base and is operable to secure a first portion of a length of optical media tape to the base;
a feed roller that is interconnected to the base and spaced from the clamp, wherein the feed roller is movable along a first axis, and wherein the feed roller is operable to support a second portion of the optical media tape length that is spaced from the first portion; and
a drum that is interconnected to the base and rotatable about a second axis that is substantially parallel to the first axis, wherein the drum is operable to contact a third portion of the optical media tape length that is disposed between the first and second portions of the optical media tape length.

12. The fixture of claim 11, further comprising:
a reference plane disposed through the clamp, feed roller and drum, wherein the reference plane is substantially perpendicular to the first and second axes.

13. The fixture of claim 11, further comprising:
a sled mechanism that interconnects the feed roller to the base, wherein the sled mechanism facilitates sliding of the feed roller relative to the base in first and second opposing directions along the first axis.

14. The fixture of claim 11, further comprising:
an adjustment mechanism rigidly interconnected to the drum, wherein rotation of the adjustment mechanism induces a corresponding rotation of the drum along the second axis.

15. The fixture of claim 11, wherein the drum comprises:
a sidewall;
an outer cylindrical testing surface disposed over the sidewall that is operable to receive a segment of the optical media tape length; and
at least one planar mounting surface disposed over the sidewall onto which the optical media tape length segment is to be secured.

16. A method for mounting a segment of optical tape over a cylindrical testing surface of a testing drum, the method comprising:
fixing a first portion of a length of optical tape to a fixture;
positioning a second portion of the optical tape length over a feed roller of the fixture;
first securing a third portion of the optical tape length to a mounting surface of a sidewall of a testing drum of the fixture, wherein the third portion is disposed between the first and second portions;
first severing the optical tape length adjacent the third portion;

rotating the testing drum about a first axis to wrap the optical tape length around a cylindrical testing surface of the sidewall of the testing drum;

second securing a fourth portion of the optical tape length to the mounting surface of the testing drum; and second severing the optical tape length adjacent the fourth portion, wherein after the optical tape length has been severed adjacent the fourth portion, a segment of the optical tape length is secured to the testing drum.

17. The method of claim 16, further comprising during the rotating:

moving the feed roller along at least one of first and second opposing directions.

18. The method of claim 17, wherein the first and second opposing directions lie along a second axis that is substantially parallel to the first axis.

19. The method of claim 17, further comprising during the rotating:

monitoring for axial run-out of the optical tape length over the cylindrical testing surface of the testing drum, wherein the moving occurs responsive to axial run-out detected during the monitoring.

20. The method of claim 16, wherein the second severing occurs after approximately a single revolution of the testing drum.

* * * * *

UNITED STATES PATENT AND TRADEMARK OFFICE
CERTIFICATE OF CORRECTION

PATENT NO. : 8,510,766 B2
APPLICATION NO. : 13/316966
DATED : August 13, 2013
INVENTOR(S) : Mahnad et al.

Page 1 of 1

It is certified that error appears in the above-identified patent and that said Letters Patent is hereby corrected as shown below:

In the Specification

In column 10, line 35, delete "inital" and insert -- initial --, therefor.

Signed and Sealed this
Twelfth Day of November, 2013

Teresa Stanek Rea
*Deputy Director of the United States Patent and Trademark Office*